(12) United States Patent
DeCelles et al.

(10) Patent No.: US 9,405,132 B2
(45) Date of Patent: Aug. 2, 2016

(54) EYEWEAR WITH INTEGRATED BOTTLE CAP OPENER

(71) Applicant: William Painter, Inc., San Diego, CA (US)

(72) Inventors: Matthew DeCelles, San Diego, CA (US); Steven Dempsey, Napa, CA (US); Patrick Eckstein, San Diego, CA (US); Zach Luczynski, San Diego, CA (US); Eric Zugner, El Cajon, CA (US)

(73) Assignee: William Painter, Inc., San Diego, CA (US)

( * ) Notice: Subject to any disclaimer, the term of this patent is extended or adjusted under 35 U.S.C. 154(b) by 0 days.

(21) Appl. No.: 13/865,095

(22) Filed: Apr. 17, 2013

(65) Prior Publication Data

US 2014/0139801 A1 May 22, 2014

Related U.S. Application Data

(60) Provisional application No. 61/625,365, filed on Apr. 17, 2012.

(51) Int. Cl.
*G02C 1/00* (2006.01)
*G02C 11/00* (2006.01)
*G02C 5/14* (2006.01)

(52) U.S. Cl.
CPC ............... *G02C 11/00* (2013.01); *G02C 5/143* (2013.01)

(58) Field of Classification Search
CPC ............................... G02C 5/143; G02C 11/02
USPC ......... 351/158, 121, 41, 111; 215/400; 7/170, 7/169, 128, 151, 158; D16/309, 335
See application file for complete search history.

(56) References Cited

U.S. PATENT DOCUMENTS

| | | | |
|---|---|---|---|
| D354,763 S | 1/1995 | Wang | |
| D364,547 S | 11/1995 | Lage | |
| 5,793,462 A | 8/1998 | Sample et al. | |
| D409,222 S | 5/1999 | Raub | |

(Continued)

FOREIGN PATENT DOCUMENTS

| | | |
|---|---|---|
| FR | 935388-005 | 1/1994 |
| FR | 953109-001 | 8/1995 |

OTHER PUBLICATIONS

Utlit-Key—6 in 1 Keyring Gadget Tool with Phillips Screwdriver, *Utili-Key*, <http://www.latestbuy.com.au/utili_key_gadget.html>, [retrieved on Jun. 8, 2012].

(Continued)

*Primary Examiner* — Hung Dang
(74) *Attorney, Agent, or Firm* — Mintz Levin Cohn Ferris Glovsky and Popeo, P.C.

(57) ABSTRACT

Eyewear and a temple arm for eyewear with an integrated bottle cap opener are disclosed. The temple arm is preferably formed of a unitary rigid material, and has a lens frame interface at a proximal end and a downwardly curved ear bridge at a distal end opposite the proximal end. The temple arm further has a substantially straight top edge and a bottom edge having a cutout defined by a point on a forward end and a hump on a rearward end, the point being directed toward the curved ear bridge for engaging the underside of a bottle cap such that the hump acts as a fulcrum to enable the temple arm to be a second-class lever for removing the bottle cap from a bottle.

15 Claims, 3 Drawing Sheets

(56) References Cited

U.S. PATENT DOCUMENTS

| | | |
|---|---|---|
| D414,795 S | 10/1999 | Grimaldi |
| D427,622 S | 7/2000 | Conway |
| 7,367,670 B2 * | 5/2008 | Duane .......................... 351/158 |
| D581,450 S | 11/2008 | Moritz |
| D630,674 S | 1/2011 | Markovitz |
| D652,442 S | 1/2012 | Yee et al. |
| D659,182 S | 5/2012 | Shin et al. |
| D679,315 S | 4/2013 | DeCelles et al. |
| D680,574 S | 4/2013 | DeCelles et al. |
| 2008/0239235 A1 * | 10/2008 | Severino ...................... 351/158 |
| 2009/0096984 A1 * | 4/2009 | Ianelli et al. ................. 351/158 |

OTHER PUBLICATIONS

WestSky Promotions, Inc., *Corning Promos—Sunglasses V5*, <http:westsky.logomall.com/ProductDetail/ProductDetail.aspx?Ntt=su . . . > [retrieved on Apr. 8, 2012].

* cited by examiner

EYEWEAR WITH INTEGRATED BOTTLE CAP OPENER

CROSS-REFERENCE TO RELATED APPLICATIONS

This application claims the benefit of priority under 35 U.S.C. §119(e) of U.S. Provisional Patent Application Ser. No. 61/625,365, filed Apr. 17, 2012, entitled "Eyewear With Integrated Bottle Cap Opener," the disclosure of which is incorporated by reference herein.

BACKGROUND

Bottle cap openers have been integrated with various products, such as keychains, pocket knives, and footwear. There have even been attempts to integrate a bottle cap opener with eyewear, but such attempts typically provide a metal edge within a plastic temple arm or at the end of the ear bridge. One issue is that conventional eyewear is not designed to provide the durability and leverage required to open modern bottle caps. Another issue is that a bottle cap opener part of the eyewear is not located on the eyewear for optimal comfort and use, and can be awkward to use effectively.

SUMMARY

This document describes eyewear and a temple arm for eyewear with an integrated bottle cap opener. According to one aspect, an apparatus includes a temple arm for eyewear. The temple arm is formed of a unitary rigid material, and has a lens frame interface at a proximal end and a downwardly curved ear bridge at a distal end opposite the proximal end. The temple arm further has a substantially straight top edge and a bottom edge having a cutout defined by a point on a forward end and a hump on a rearward end, the point being directed toward the curved ear bridge for engaging the underside of a bottle cap such that the hump acts as a fulcrum to enable the temple arm to be a second-class lever for removing the bottle cap from a bottle.

In another aspect, an apparatus includes a pair of eyeglass lenses, and a pair of temple arms, each temple arm being connected with one of the eyeglass lenses and having a downwardly curved ear bridge. At least one temple arm of the pair of temple arms is formed as described above to include an integrated bottle cap opener. In yet another aspect, an apparatus includes a frame holding a pair of eyeglass lenses, and a pair of temple arms, each temple arm being connected to one of opposite sides of the frame and having a downwardly curved ear bridge. At least one temple arm of the pair of temple arms is formed as described above, to include an integrated bottle cap opener.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes eyewear such as glasses, sunglasses, etc., having an integrated container opener, such as an opener for a bottle cap, a pull-tab for a can, or the like. In preferred implementations, the bottle opener is integrated into a bottom edge of a temple arm and ear bridge. In some implementations, the temple arm/ear bridge is formed of a unitary piece of material, and the bottle opener is formed therein with a cutout to a point as a lever, and a hump as the fulcrum that cooperates with the point. In other implementations, the temple arm/ear bridge is made of a first material, and at least the point includes a second, rigid material affixed therein, such as glued, riveted, or the like. For example, at least a portion of an edge or periphery of the temple arm/ear bridge can be a first material, such as a rigid material like a metal, mated with a second material that forms the remainder of the temple arm/ear bridge, where the second material can be a less expensive or less rigid material such as a plastic.

Figure 1:
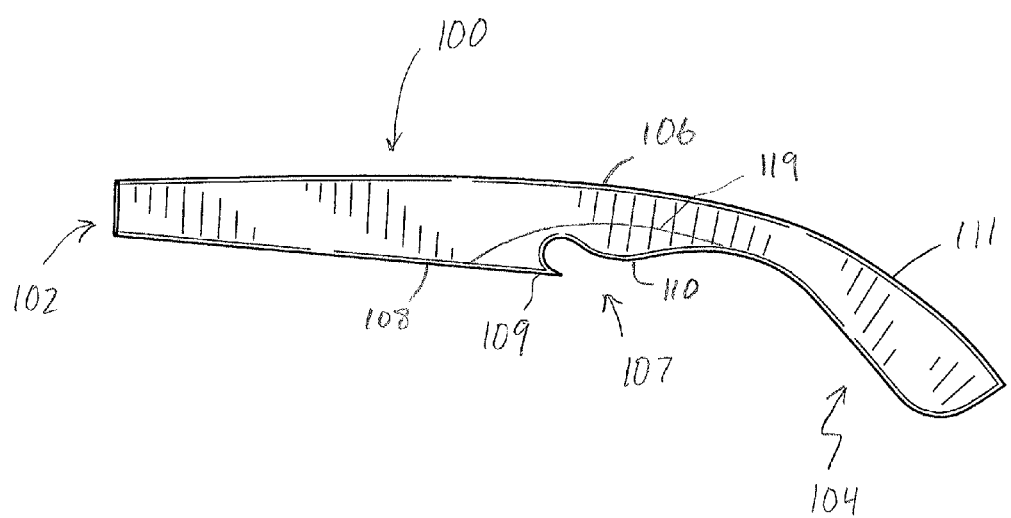
FIG. 1 shows a temple arm, such as can be used for eyewear, including an integrated bottle cap opener.

FIG. 1 shows a temple arm 100, such as can be used for eyewear, including an integrated bottle cap opener 107. The temple arm 100 is configured for attachment to either lenses or a lens frame, either of which is for positioning lenses in front of a wearer's eyes. The temple arm 100 is preferably formed of a unitary rigid material, such as a metal, a metal alloy, a carbon-based material such as carbon fiber, or other rigid material that can accommodate a large amount of pressure or force against it.

The temple arm 100 has a lens frame interface 102 at a proximal end and a downwardly curved ear bridge 104 at a distal end opposite the proximal end. The temple arm 100 further includes a substantially straight top edge 106 and a bottom edge 108. The bottom edge 108 includes the bottle cap opener 107 in the form of a cutout in the bottom edge 108, defined by a point 109 on a forward end of the bottle cap opener 107, and a hump 110 on a rearward end of the bottle cap opener.

The point 109 is preferably directed toward the curved ear bridge 104, and is configured for engaging the underside of a bottle cap, such that the hump 110 acts as a fulcrum to enable the temple arm 100 to act as a lever for removing the bottle cap from a bottle. In preferred implementations, the temple arm 100 with integrated bottle cap opener acts as a second-class lever, i.e. the fulcrum or hump 110 is at the far end of the bottle cap opener 107, placed on the top of a crown of the bottle cap, with the primary force being applied at the near end of the bottle cap opener 107, on a crown edge of the bottle cap, between the fulcrum and the user's hand from the temple arm 100 being pushed up by one or more of the user's fingers, as at least one of the user's fingers is placed along the top edge 106 and over the curved ear bridge 104 to provide further leverage and secondary force distally from the primary force exerted on the temple arm 100.

In some implementations, the temple arm 100 is formed of a unitary piece of material. In other implementations, a portion of the temple arm 100 is made of a first material, and at least the point 109 includes a second, rigid material affixed therein, such as glued, riveted, or the like. For example, at least a portion 119, such as an edge or periphery of the temple arm 100, can be a first material, such as a rigid material like a metal, mated with a second material that forms the remainder of the temple arm/ear bridge, where the second material can be a less expensive or less rigid material such as a plastic.

Figure 2:
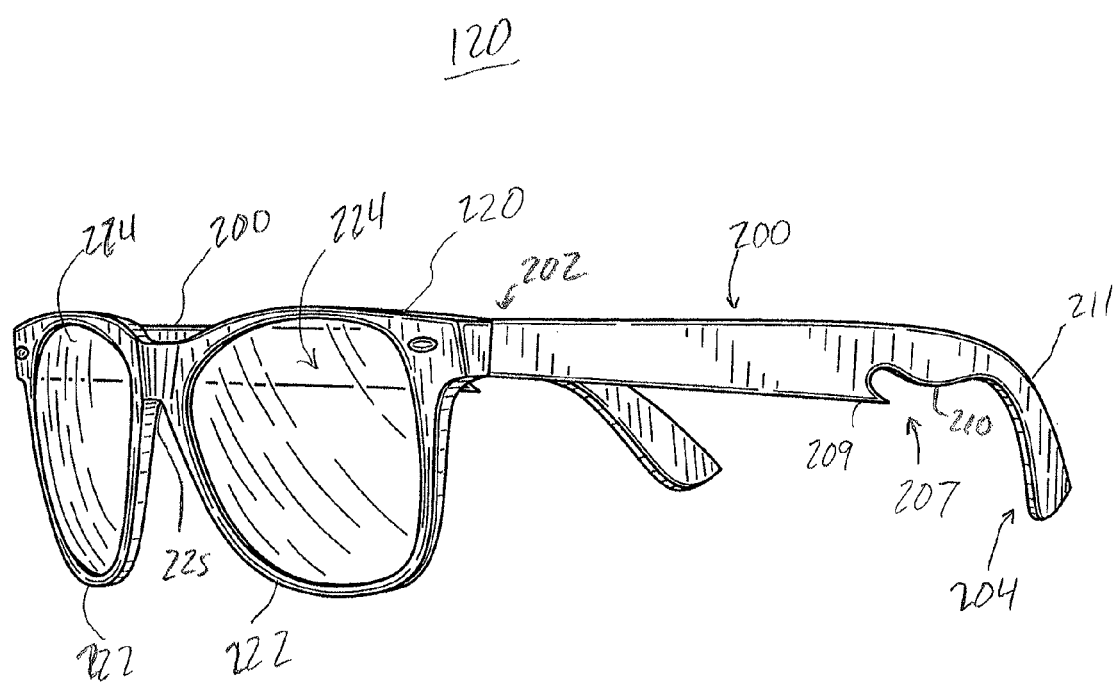
FIG. 2 shows eyewear that includes at least one, and preferably both, temple arms having an integrated bottle cap opener.

FIG. 2 shows eyewear 120 that includes at least one, and preferably both, temple arms 200 having an integrated bottle cap opener 207. The eyewear 120 includes two lenses 224 that are adapted for being positioned in front of the eyes of a wearer or user. In some implementations, the lenses 224 can be connected directly with the temple arms 200, i.e. via a hinge or other such connecting mechanism. In other implementations, the lenses 224 are at least partially circumscribed by frame 220. For example, lens frames 222 can circumscribe each of the lenses 224. Lenses 224 and/or lens frames 222 can be connected by nose bridge 225, which is adapted to either rest directly on the wearer's nose or which can include pads (not shown) for resting on the wearer's nose.

The temple arm 200 has a lens frame interface 202 at a proximal end and a downwardly curved ear bridge 204 at a distal end opposite the proximal end. The temple arm 200 further includes a substantially straight top edge 206 and a bottom edge 208. The bottom edge 208 includes the bottle cap opener 207 in the form of a cutout in the bottom edge 208, defined by a point 209 on a forward end of the bottle cap opener 207, and a hump 210 on a rearward end of the bottle cap opener.

The point 209 is preferably directed toward the curved ear bridge 204, and is configured for engaging the underside of a bottle cap, such that the hump 210 acts as a fulcrum to enable the temple arm 200 to act as a lever for removing the bottle cap from a bottle. In preferred implementations, the temple arm 200 with integrated bottle cap opener acts as a second-class lever, i.e. the fulcrum or hump 210 is at the far end of the bottle cap opener 207, placed on the top of a crown of the bottle cap, with the primary force being applied at the near end of the bottle cap opener 207, on a crown edge of the bottle cap, between the fulcrum and the user's hand from the temple arm 200 being pushed up by one or more of the user's fingers, as at least one of the user's fingers is placed along the top edge 206 and over the curved ear bridge 204 to provide further leverage and secondary force distally from the primary force exerted on the temple arm 200.

Figure 3:
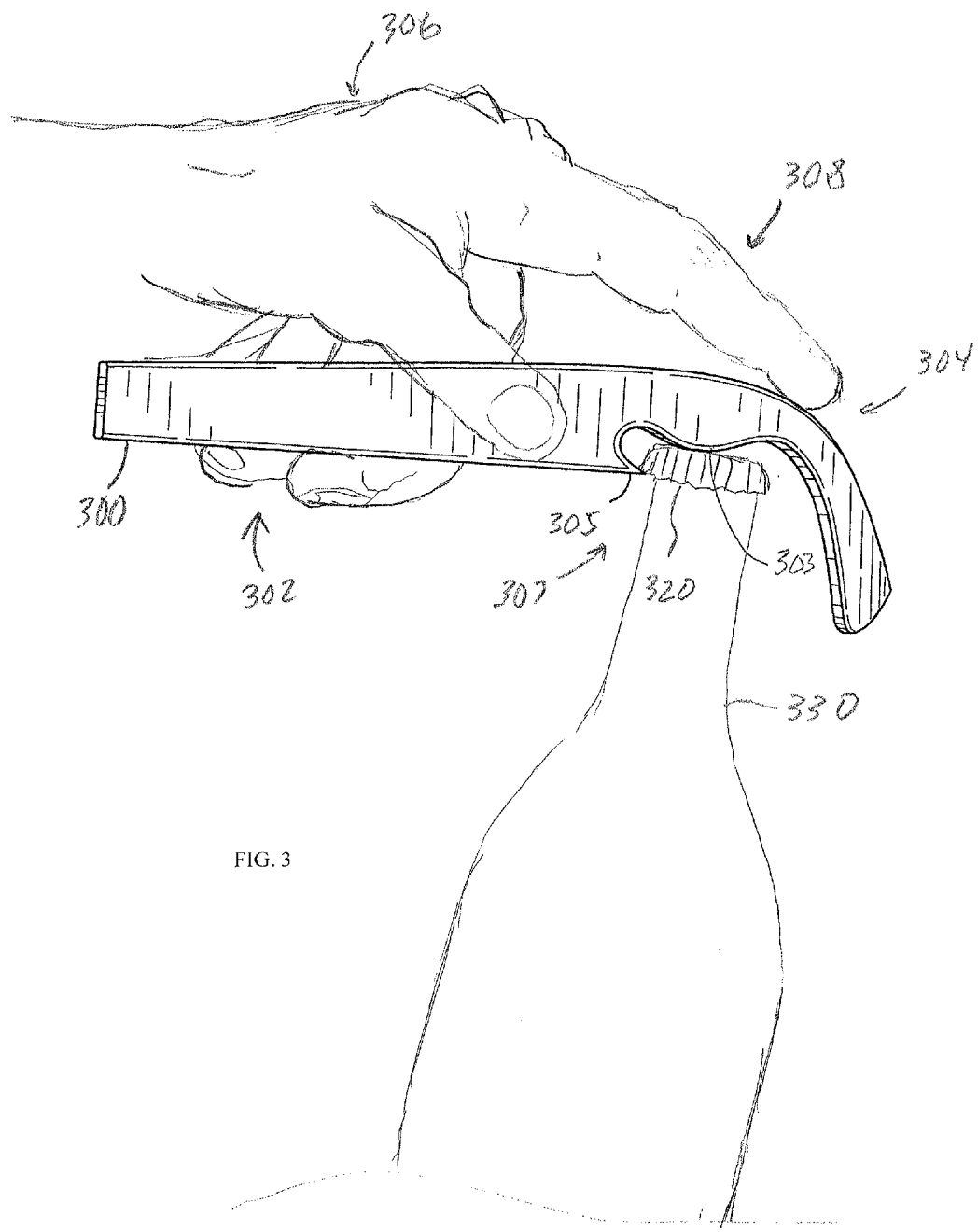
FIG. 3 illustrates the use of a temple arm of eyewear as described above

FIG. 3 illustrates the use of a temple arm 300 of eyewear as described above. The temple arm 300 with integrated bottle cap opener 307 acts as a second-class lever, i.e. the fulcrum or hump 303 is at the far end of the bottle cap opener 307, and placed on the top of a crown of a bottle cap 320, with the primary force 302 being applied at the near end of the bottle cap opener 307 (i.e. relative to the lenses of the eyewear) and on a crown edge of the bottle cap 320, between the fulcrum or hump 303 and the user's hand 306, from the temple arm 300 being pushed up by one or more of the user's fingers, as at least one of the user's fingers 308 can be placed along the top edge of the temple arm 300, and at least partially over the curved ear bridge of the temple arm, to provide further leverage and secondary force 304 opposite and distally from the primary force 302 exerted on the temple arm 300 by the user. In this way, the temple arm 300 of the eyewear can provide simple and effective opening and removal of a bottle cap 320 from a bottle 330, using a unitary material and design of the temple arm 300. Further, the bottle cap opener 307 is positioned forward enough of the downwardly curved ear bridge portion so as to not be near contact with the wearer's ear, or risk poking the user's ear. The lenses or lens frame of the eyewear would prevent the bottle cap opener 307 from extending to the user's ear if the eyewear is worn properly.

Although a few embodiments have been described in detail above, other modifications are possible. Other embodiments may be within the scope of the following claims.

What is claimed is:

1. An apparatus comprising:
a temple arm for eyewear formed of a unitary rigid material, the temple arm having a lens frame interface at a proximal end and a downwardly curved ear bridge at a distal end opposite the proximal end, the temple arm further having a substantially straight top edge and a substantially straight bottom edge having a cutout disposed toward the distal end of the temple arm, the cutout defined by a point on a forward portion and a hump on a rearward portion, the point being aligned with the substantially straight bottom edge and directed toward the curved ear bridge such that the cutout is recessed from the substantially straight bottom edge, the point for engaging the underside of a bottle cap while the hump abuts a top of the bottle cap as a fulcrum for the point against the underside of the bottle cap for removing the bottle cap from a bottle, the cutout and the temple arm being configured to facilitate exertion of a primary upward force on the bottom edge of the temple arm, proximal to the cutout, and the cutout and the curved ear bridge being configured to facilitate exertion of a secondary downward force on a top edge of the curved ear bridge.

2. The apparatus in accordance with claim 1, further comprising a material coating the point and the hump.

3. The apparatus in accordance with claim 2, wherein the material coating the point and the hump is formed of metal.

4. The apparatus in accordance with claim 2, wherein the material coating the point and the hump is affixed to the temple arm by rivets.

5. The apparatus in accordance with claim 2, wherein the material coating the point and the hump is affixed to the temple arm by adhesive.

6. An apparatus comprising:
a pair of eyeglass lenses; and
a pair of temple arms formed of a unitary material, each temple arm being connected with one of the eyeglass lenses and having a downwardly curved ear bridge;
wherein at least one temple arm of the pair of temple arms has a lens frame interface at a proximal end and the downwardly curved ear bridge at a distal end opposite the proximal end, the temple arm further having a substantially straight top edge and a substantially straight bottom edge having a cutout disposed toward the distal end of the temple arm, the cutout defined by a point on a forward portion and a hump on a rearward portion, the point being aligned with the substantially straight bottom edge and directed toward the curved ear bridge such that the cutout is recessed from the substantially straight bottom edge, the point for engaging the underside of a bottle cap while the hump abuts a top of the bottle cap as a fulcrum for the point against the underside of the bottle cap for removing the bottle cap from a bottle, the cutout and the temple arm being configured to facilitate exertion of a primary upward force on the bottom edge of the temple arm, proximal to the cutout, and the cutout and the curved ear bridge being configured to facilitate exertion of a secondary downward force on a top edge of the curved ear bridge.

7. The apparatus in accordance with claim 6, further comprising a material coating the point and the hump.

8. The apparatus in accordance with claim 7, wherein the material coating the point and the hump is formed of metal.

9. The apparatus in accordance with claim 7, wherein the material coating the point and the hump is affixed to the temple arms by rivets.

10. The apparatus in accordance with claim 7, wherein the material coating the point and the hump is affixed to the temple arms by adhesive.

11. An apparatus comprising:
a frame holding a pair of eyeglass lenses; and
a pair of temple arms formed from a unitary material, each temple arm being connected to one of opposite sides of the frame and having a downwardly curved ear bridge;
wherein at least one temple arm of the pair of temple arms has a lens frame interface at a proximal end and the downwardly curved ear bridge at a distal end opposite the proximal end, the temple arm further having a substantially straight top edge and a substantially straight bottom edge having a cutout disposed toward the distal end of the temple arm, the cutout defined by a point on a forward portion and a hump on a rearward portion, the point being aligned with the substantially straight bottom edge and directed toward the curved ear bridge such that the cutout is recessed from the substantially straight bottom edge, the point for engaging the underside of a bottle cap while the hump abuts a top of the bottle cap as a fulcrum for the point against the underside of the bottle cap for removing the bottle cap from a bottle, the cutout and the temple arm being configured to facilitate exertion of a primary upward force on the bottom edge of the temple arm, proximal to the cutout, and the cutout and the curved ear bridge being configured to facilitate exertion of a secondary downward force on a top edge of the curved ear bridge.

12. The apparatus in accordance with claim 11, further comprising a material coating the point and the hump.

13. The apparatus in accordance with claim 12, wherein the material coating the point and the hump is affixed to the temple arms by rivets.

14. The apparatus in accordance with claim 12, wherein the material coating the point and the hump is affixed to the temple arms by adhesive.

15. The apparatus in accordance with claim 11, wherein the material coating the point and the hump is formed of metal.

* * * * *